(12) United States Patent
Yamasaki et al.

(10) Patent No.: US 10,940,620 B2
(45) Date of Patent: Mar. 9, 2021

(54) METHOD FOR MANUFACTURING FOAM MOLDED BODY

(71) Applicant: KYORAKU CO., LTD., Kyoto (JP)

(72) Inventors: Yoshihiro Yamasaki, Kanagawa (JP); Teruo Tamada, Tokyo (JP); Yu Igarashi, Kanagawa (JP); Yuta Minamigawa, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 16/336,193

(22) PCT Filed: Sep. 22, 2017

(86) PCT No.: PCT/JP2017/034274
§ 371 (c)(1),
(2) Date: Mar. 25, 2019

(87) PCT Pub. No.: WO2018/062033
PCT Pub. Date: Apr. 5, 2018

(65) Prior Publication Data
US 2019/0224891 A1    Jul. 25, 2019

(30) Foreign Application Priority Data

Sep. 30, 2016   (JP) .............................. JP2016-193531
Sep. 13, 2017   (JP) .............................. JP2017-176128

(51) Int. Cl.
*B29C 44/12*       (2006.01)
*B29C 44/42*       (2006.01)
(Continued)

(52) U.S. Cl.
CPC .......... *B29C 44/1285* (2013.01); *B29C 44/00* (2013.01); *B29C 44/08* (2013.01);
(Continued)

(58) Field of Classification Search
CPC ... B29C 51/10; B29C 44/1285; B29C 44/505; B29C 48/0017; B29C 44/00;
(Continued)

(56) References Cited

U.S. PATENT DOCUMENTS

2001/0036971 A1   11/2001   Usui et al.
2004/0062885 A1   4/2004    Imanari et al.
(Continued)

FOREIGN PATENT DOCUMENTS

JP   H10-156916 A     6/1998
JP   2000-229349 A    8/2000
(Continued)

OTHER PUBLICATIONS

The partial supplementary European Search Report dated Aug. 30, 2019, in corresponding European patent application No. 17855987.8; 15 pages.
(Continued)

*Primary Examiner* — Stella K Yi
(74) *Attorney, Agent, or Firm* — Maier & Maier, PLLC (57) ABSTRACT

A method for manufacturing a foam molded body which can allow the foam resin sheet to follow the shape of the cavity of the mold with high accuracy even when the thickness of the foam resin sheet is thick. The method includes an arranging step to arrange one sheet of a foam resin sheet between first and second molds, the foam resin sheet being formed by extruding and dangling a molten foam resin from a slit; and an expanding step to expand the foam resin sheet by subjecting the foam resin sheet to a reduced pressure suction.

14 Claims, 7 Drawing Sheets

(51) Int. Cl.
*B29C 44/58* (2006.01)
*B29C 44/00* (2006.01)
*B29C 48/00* (2019.01)
*B29C 44/08* (2006.01)
*B29C 51/30* (2006.01)
*B29C 44/48* (2006.01)
*B29C 44/50* (2006.01)
*B29C 51/36* (2006.01)
*B29C 51/10* (2006.01)
*B29C 51/32* (2006.01)

(52) U.S. Cl.
CPC .............. *B29C 44/42* (2013.01); *B29C 44/48* (2013.01); *B29C 44/505* (2016.11); *B29C 44/58* (2013.01); *B29C 48/0017* (2019.02); *B29C 51/10* (2013.01); *B29C 51/30* (2013.01); *B29C 51/32* (2013.01); *B29C 51/36* (2013.01)

(58) Field of Classification Search
CPC ......... B29C 44/08; B29C 44/42; B29C 44/48; B29C 51/30; B29C 51/32; B29C 51/36; B29C 44/465; B29C 65/782; B29C 66/92611; B29C 66/92613; B29C 66/92615; B29C 2043/5841; B29C 44/083; B29C 44/1219; B29C 44/146; B29C 44/3496; B29C 44/585; B29C 44/586; B29C 44/26; B29C 33/18; B29C 2045/14155; B29C 2045/1745
See application file for complete search history.

(56) References Cited

U.S. PATENT DOCUMENTS

2006/0049551 A1    3/2006  Hanada et al.
2007/0125780 A1*   6/2007  Shiina ................... B29C 44/04
                                                      220/23.87
2013/0216747 A1    8/2013  Ishida

FOREIGN PATENT DOCUMENTS

| JP | 2000-326343 A | 11/2000 |
| JP | 2001-310380 A | 11/2001 |
| JP | 2006-068919 A | 3/2006 |
| JP | 2010-269510 A | 12/2010 |
| JP | 2010-280141 A | 12/2010 |
| JP | 2013-071309 A | 4/2013 |
| JP | 5546163 B2 | 7/2014 |
| JP | 2016-172438 A | 9/2016 |

OTHER PUBLICATIONS

International Search Report dated Nov. 7, 2017 in corresponding International Application No. PCT/JP2017/034274; 6 pages.

\* cited by examiner

METHOD FOR MANUFACTURING FOAM MOLDED BODY

TECHNICAL FIELD

The present invention relates to a method for manufacturing a foam molded body such as an interior member of a car (door trim and ceiling material for example), a board such as a luggage floor board, a duct, an engine under cover, and the like.

BACKGROUND

Patent Literature 1 discloses a technique in which one foam resin sheet is reheated, and then the softened foam resin sheet is arranged between a pair of split molds, followed by suction from the molds on both sides under reduced pressure. Accordingly, the foam resin sheet undergoes a secondary foaming to give a thick portion.

CITATION LIST

Patent Literature

[Patent Literature 1] JP 2001-310380A

SUMMARY OF INVENTION

Technical Problem

In the technique of Patent Literature 1, a foam resin sheet of ambient temperature is prepared before-hand, and is softened by reheating by radiant heat such as infrared heater when forming is carried out. In such method, problem seldom occur when the foam resin sheet is extremely thin, however, as the thickness of the foam resin sheet increases, softening of the central portion of the foam resin sheet in the thickness direction becomes insufficient, thereby resulting in degradation of shaping characteristic and it becomes difficult for the foam resin sheet to follow the shape of the cavity of the mold.

The present invention has been made by taking the aforementioned circumstances into consideration. The present invention provides a method for manufacturing a foam molded body which can allow the foam resin sheet to follow the shape of the cavity of the mold with high accuracy even when the thickness of the foam resin sheet is thick.

Solution to Problem

According to the present invention, a method for manufacturing a foam molded body, comprising the steps of: an arranging step to arrange one sheet of a foam resin sheet between a first mold and a second mold, the foam resin sheet being formed by extruding and dangling a molten foam resin from a slit; and an expanding step to expand the foam resin sheet by subjecting the foam resin sheet to a reduced pressure suction in a condition where the first mold and the second mold are closened to provide a gap between the first mold and the second mold, the gap having a thickness larger than a thickness of the foam resin sheet, thereby expanding the foam resin sheet to have the thickness of the gap, is provided.

In the present invention, rather than using a softened foam resin sheet obtained by reheating the foam resin sheet of ambient temperature, one sheet of a foam resin sheet formed by extruding and dangling a molten foam resin from a slit is used. In the foam resin sheet thus formed, influence of cooling by atmosphere becomes small towards the center of the foam resin sheet with respect to the thickness direction. Therefore, the temperature rises and the viscosity decreases towards the center of the foam resin sheet with respect to the thickness direction. Accordingly, in the present invention, the foam resin sheet can follow the shape of the cavity of the mold of with high accuracy even when the thickness of the foam resin sheet is thick.

Further, in the conventional technique, when the softening at the central portion of the foam resin sheet is insufficient, secondary foaming would mainly occur at the vicinity of the surface of the foam resin sheet when reduced pressure suction of the foam resin sheet is performed from both of the pair of molds. Accordingly, the rigidity at the thick portion tended to become insufficient. On the other hand, in the present invention, the viscosity would decrease towards the center of the foam resin sheet with respect to the thickness direction. Accordingly, when the foam resin sheet undergoes reduced pressure suction from both of the pair of molds, foaming is enhanced mainly at the vicinity of the center of the foam resin sheet, thereby expanding the foam resin sheet. Therefore, in the present invention, the foam molded body is structured so that a layer at the vicinity of the center of the foam resin sheet in the thickness direction (central layer) has a large average bubble diameter, and a skin layer at the vicinity of the surface of the foam resin sheet has a small average bubble diameter. Since such foam molded body has a sandwich structure in which the central layer having larger average bubble diameter is sandwiched by skin layers having smaller average bubble diameter, the foam molded body is light in weight and high in rigidity.

Accordingly, in the present invention, a foam resin sheet can follow the shape of the cavity of the mold with high accuracy even when the thickness of the foam resin sheet is thick, and a foam molded body which is light in weight and high in rigidity can be manufactured.

Hereinafter, various embodiments of the present invention will be described. The embodiments described hereinafter can be combined with each other.

Preferably, the expanding step comprises performing a first suction step, a mold closening step, and a second suction step in this order; the first suction step comprises subjecting the foam resin sheet to reduced pressure suction by the first mold, thereby shaping the foam resin sheet to follow a shape of a cavity of the first mold; the mold closening step comprises closening the first mold and the second mold to each other to provide the gap in between the first mold and the second mold; the second suction step comprises subjecting the foam resin sheet to reduced pressure suction by the first mold and the second mold, thereby expanding the foam resin sheet to have the thickness of the gap.

Preferably, an entirety of a portion, which gives the foam molded body, of the foam resin sheet is expanded in the expanding step.

Preferably, the cavity of the first mold and a cavity of the second mold are structured so that the gap in the portion, which gives the foam molded body of the foam resin sheet is substantially constant.

Preferably, the cavity of the first mold has a shape with a recessed portion, and the cavity of the second mold has a shape with a convex portion which comes into the recessed portion.

Preferably, the gap has a thickness of 1.1 to 3.0 times of the thickness of the foam resin sheet.

According to another aspect of the present invention, a foam molded body comprising a central layer and skin layers provided on both sides of the central layer; wherein: the skin layer is a layer located from a surface of the foam molded body to 10% of the foam molded body in a thickness direction of the foam molded body, and the central layer is a layer located from 25 to 50% of the foam molded body in the thickness direction of the foam molded body from the surface; and an average bubble diameter of the central layer is larger than an average bubble diameter of the skin layer, is provided.

Preferably, a ratio of (the average bubble diameter of the central layer)/(the average bubble diameter of the skin layer) is 1.2 to 10.

BRIEF DESCRIPTION OF THE DRAWINGS

FIG. 4b is a sectional view corresponding to FIG. 2a, showing a condition in which the burr 23b is removed from the condition shown in FIG. 4a.

MODE FOR CARRYING OUT THE INVENTION

Hereinafter, various embodiments of the present invention will be described. Various distinctive features shown in the following embodiments can be combined with each other. In addition, an invention can be established independently for each of the distinctive features.

1. Configuration of Foam Molding Machine 1

First, with reference to FIG. 1 to FIG. 4, the foam molding machine 1 which can be used in carrying out the manufacturing method of the foam molded body of one embodiment of the present invention will be explained. The foam molding machine 1 comprises a resin supplying machine 2, a T-die 18, and molds 21 and 22. The resin supplying machine 2 comprises a hopper 12, an extruder 13, an injector 16, and an accumulator 17. The extruder 13 and the accumulator 17 are connected via a connecting tube 25. The accumulator 17 and the T-die 18 are connected via a connecting tube 27.

Hereinafter, each of the configuration is explained in detail.

<Hopper 12, Extruder 13>

Figure 1:
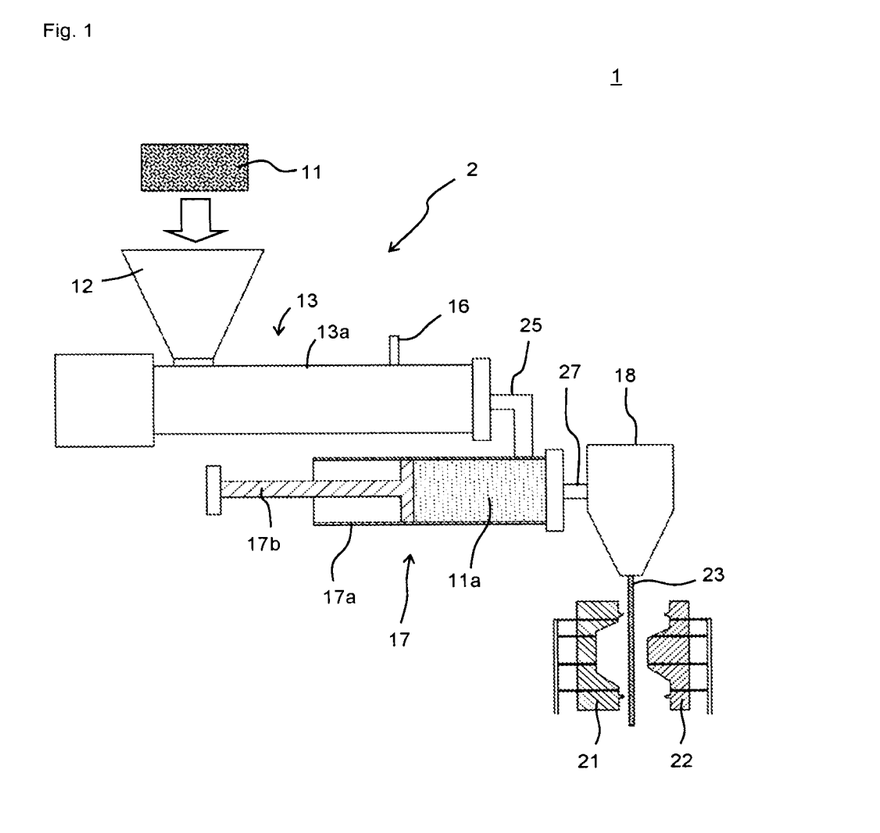
FIG. 1 shows one example of a foam molding machine 1 which can be used in the manufacturing method of the foam molded body according to one embodiment of the present invention.

The hopper 12 is used to charge the raw material resin 11 into the cylinder 13a of the extruder 13. There is no particular limitation regarding the form of the raw material resin 11, however, it is usually a pellet. The raw material resin is, for example, a thermoplastic resin such as polyolefin. As the polyolefin, low density polyethylene, linear low density polyethylene, high density polyethylene, polypropylene, ethylene-propylene copolymer, and mixtures thereof can be mentioned. After the raw material resin 11 is charged from the hopper 12 into the cylinder 13a, the raw material resin 11 is heated in the cylinder 13a, thereby melting to give a molten resin. Here, the molten resin is transferred towards the tip of the cylinder 13a by the rotation of a screw arranged in the cylinder 13a. The screw is arranged in the cylinder 13a, and the rotation thereof allows to knead and transfer the molten resin. At the rear anchor of the screw, a gear device is provided to rotationally drive the screw. The number of screws arranged in the cylinder 13a can be one and can be two or more.

<Injector 16>

An injector 16 is provided with the cylinder 13a to inject a foaming agent into the cylinder 13a. As the foaming agent injected from the injector 16, a physical foaming agent, a chemical foaming agent, and a mixture thereof can be mentioned. Here, the physical foaming agent is preferable. As the physical foaming agent, an inorganic physical foaming agent such as air, carbon dioxide gas, nitrogen gas, water, and the like; and organic physical foaming agent such as butane, pentane, hexane, dichloromethane, dichloroethane and the like; and supercritical fluid thereof can be used. As the supercritical fluid, it is preferable to prepare the supercritical fluid using carbon dioxide, nitrogen, and the like. When nitrogen is used, supercritical fluid can be obtained with the critical temperature of −149.1° C. and critical pressure of 3.4 MPa or more. When carbon dioxide is used, supercritical fluid can be obtained with the critical temperature of 31° C. and critical pressure of 7.4 MPa or more. As the chemical foaming agent, those which can generate carbon dioxide gas by the reaction of acid (for example, citric acid or salt thereof) and base (for example, sodium bicarbonate) can be mentioned. The chemical foaming agent can be charged from the hopper 12 instead of being injected from the injector 16.

<Accumulator 17, T-Die 18>

The foam resin obtained by melting and kneading the raw material resin and the foaming agent is extruded from the resin extruding opening of the cylinder 13a, and then injected into the accumulator 17 via the connecting tube 25. The accumulator 17 is provided with a cylinder 17a and a piston 17b, the piston 17b capable of sliding in the cylinder 17a. The foam resin can be contained in the cylinder 17a. By moving the piston 17b after a prescribed amount of the foam resin is contained in the cylinder 17a, the foam resin is extruded from the slit provided in the T-die 18 via the connecting tube 27, thereby dangling the foam resin to form the foam resin sheet 23.

<First Mold 21 and Second Mold 22>

Figure 2A:
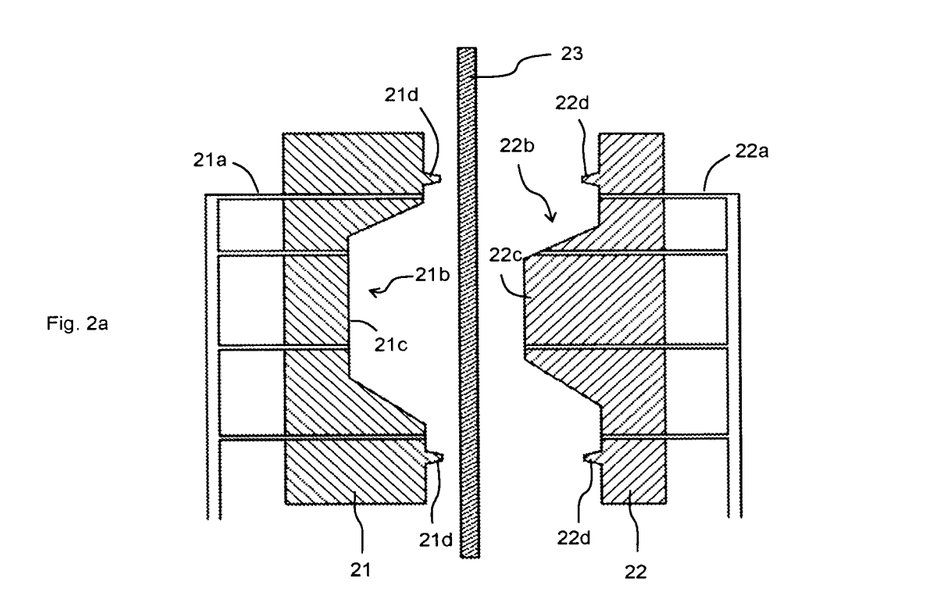
FIG. 2a is an enlarged sectional view of the vicinity of the first mold 21, the second mold 22, and the foam resin sheet 23 of FIG. 1.
Figure 2B:
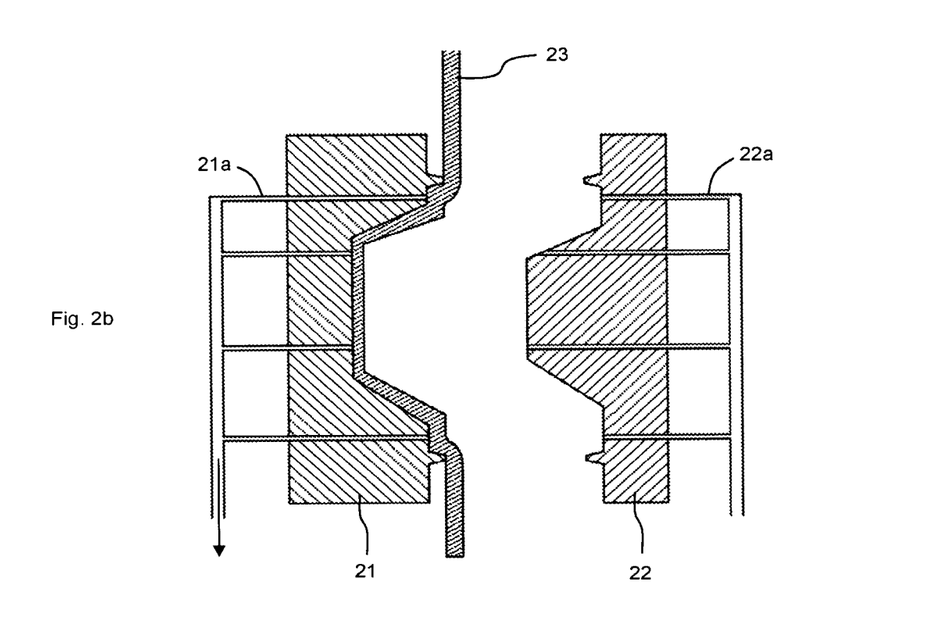
FIG. 2b is a sectional view corresponding to FIG. 2a, showing a condition in which the foam resin sheet 23 is subjected to reduced pressure suction by the first mold 21 from the condition shown in FIG. 2a, thereby shaping the foam resin sheet 23 to follow the shape of cavity 21b of the first mold 21.
Figure 3A:
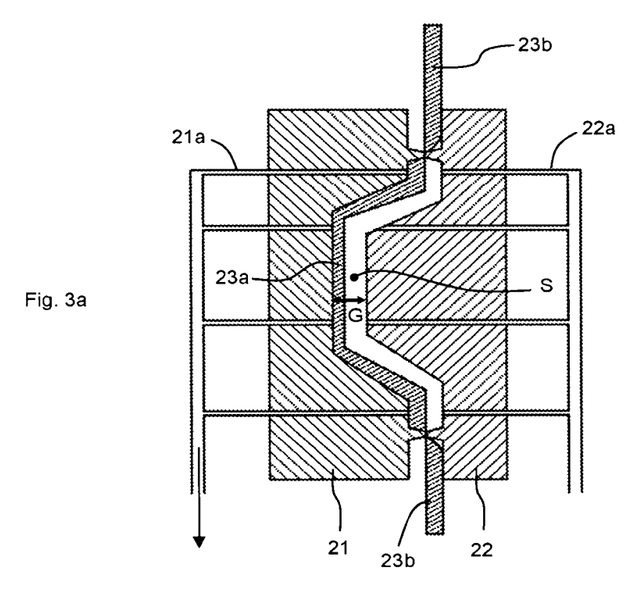
FIG. 3a is a sectional view corresponding to FIG. 2a, showing a condition in which the molds 21 and 22 are closened to each other from the condition shown in FIG. 2b.
Figure 3B:
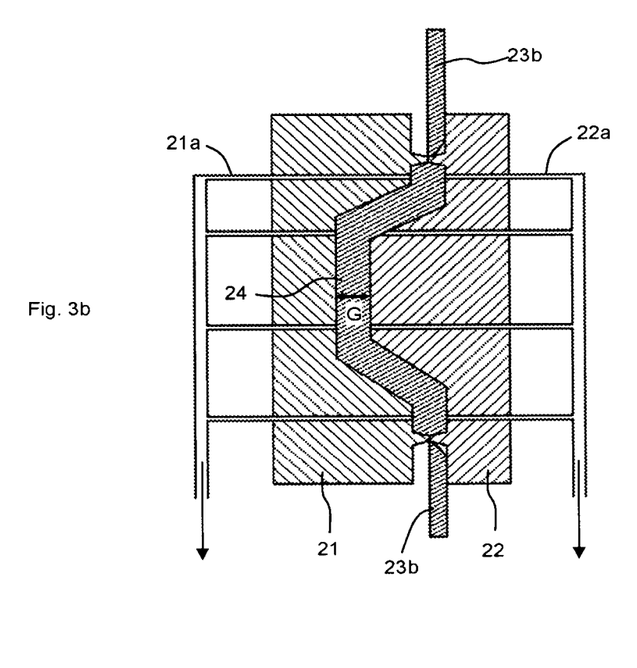
FIG. 3b is a sectional view corresponding to FIG. 2a, showing a condition in which the foam resin sheet 23 is subjected to reduced pressure suction by the second mold 22 from the condition shown in FIG. 3a, thereby allowing the foam resin sheet 23 to expand to the thickness of the gap G between the molds 21 and 22.

The foam resin sheet 23 is introduced between the first mold 21 and the second mold 22. As shown in FIG. 1 to FIG. 3, the first mold 21 is provided with a plurality of reduced pressure suction holes 21a, and can shape the foam resin sheet 23 so as to follow the shape of the cavity 21b of the first mold 21 by reduced pressure suction. The cavity 21b has a recessed portion 21c, and a pinch off portion 21d surrounds the recessed portion 21c. The second mold 22 is provided with a plurality of reduced pressure suction holes 22a, and can shape the foam resin sheet 23 so as to follow the shape of the cavity 22b of the second mold 22 by reduced pressure suction. The cavity 22b has a convex portion 22c which can come into the recessed portion 21c, and a pinch off portion 22d surrounds the convex portion 22c. Here, the cavity 22b of the second mold 22 can have the recessed portion and the cavity 21b of the first mold 21 can have the convex portion which can come into the recessed portion.

2. Method for Manufacturing Foam Molded Body

Here, with reference to FIG. 2 to FIG. 4, the method for manufacturing the foam molded body according to one embodiment of the present invention will be described. The method of the present embodiment comprises an arranging step and an expanding step. Detailed explanation will be given hereinafter.

2.1 Arranging Step

In this step, as shown in FIG. 1 and FIG. 2a, one sheet of a foam resin sheet 23 is arranged between the molds 21 and 22, the foam resin sheet 23 being formed by extruding and dangling a molten foam resin from the slit of the T-die 18. In the present embodiment, a direct vacuum forming which uses the foam resin sheet 23 as extruded from the T-die 18 is performed. Accordingly, the foam resin sheet 23 would not solidify due to being cooled to room temperature before forming, and heating of the solidified foam resin sheet 23 before forming would not be performed. Here, the foam resin sheet 23 of the present embodiment has a substantially uniform temperature immediately after being extruded from the slit, and is then gradually cooled from its surface by the atmosphere during dangling. Accordingly, influence of the atmosphere to cool the foam resin sheet 23 becomes small towards the center of the foam resin sheet 23 in the thickness direction. Therefore, the foam resin sheet 23 of the present embodiment has higher temperature and lower viscosity towards the center of the foam resin sheet 23 in the thickness direction. The thickness of the foam resin sheet 23 is not particularly limited, and is 0.5 to 5 mm for example, preferably 1 to 3 mm. The thickness is, particularly for example, 0.5, 1, 1.5, 2, 2.5, 3, 3.5, 4, 4.5, or 5 mm, and can be in the range between the two values exemplified herein.

2.2 Expanding Step

In this step, as shown in FIG. 2b to FIG. 3b, the molds 21 and 22 are arranged close to each other so that a gap G having a larger thickness than the thickness of the foam resin sheet 23 is provided, and the foam resin sheet 23 is subjected to reduced pressure suction by both of the molds 21 and 22, thereby expanding the foam resin sheet 23 to have the thickness of the gap G.

In the present embodiment, the molds 21 and 22 are provided with pinch off portions 21d and 22d, respectively. When the molds 21 and 22 are closened to each other until the pinch off portions 21d and 22d come into contact, the space surrounded by the pinch off portions 21d and 22d becomes a closed space S. In the foam resin sheet 23, the portion 23a within the closed space S becomes the foam molded body 24. On the other hand, in the foam resin sheet 23, the portion outside the closed space S becomes the burr 23b.

The cavities 21b and 22b of the molds 21 and 22 are structured so that the thickness of the gap G between the molds 21 and 22 is substantially constant throughout the entirety of the portion which becomes the foam molded body 24 (that is, the portion within the closed space S) in the foam resin sheet 23. When the foam resin sheet 23 is subjected to reduced pressure suction by the molds 21 and 22 in this condition, the foam resin sheet 23 expands to the thickness of the gap G, thereby forming the foam molded body 24. Here, the pinch off portions 21d and 22d are not essential constitutions, and the molds 21 and 22 can be closened to each other without contacting with each other, thereby forming a gap G between the molds 21 and 22. However, when reduced pressure suction is performed by the molds 21 and 22 in a condition where the pinch off portions 21d and 22d are in contact with each other to form the closed space S, the pressure inside the closed space S can be reduced easily. Therefore, there is an advantage in that the foam resin sheet 23 can be expanded easily.

The thickness of the gap G is not particularly limited, and is preferably 1.1 to 3.0 times the thickness of the foam resin sheet 23. (thickness of gap G)/(thickness of foam resin sheet 23) is, particularly for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8 or 3.0, and can be in the range between the two values exemplified herein.

Regarding the reduced pressure suction by the molds 21 and 22, reduced pressure suction by the first mold 21 can be started antecedently, reduced pressure suction by the second mold 22 can be started antecedently, and reduced pressure suction by the molds 21 and 22 can be started simultaneously. Further, reduced pressure suction by the first mold 21 can be terminated antecedently, reduced pressure suction by the second mold 22 can be terminated antecedently, and reduced pressure suction by the molds 21 and 22 can be terminated simultaneously. Reduced pressure suction by the molds 21 and 22 can be started before the molds 21 and 22 are closened to each other or can be started after the molds are closened to each other.

When the foam resin sheet 23 is subjected to reduced pressure suction by both of the molds 21 and 22, foaming of the foam resin sheet 23 is enhanced, and thus the foam resin sheet 23 expands. Since the foam resin sheet 23 has lowest viscosity (highest fluidity) at the central portion of the foam resin sheet 23 in the thickness direction, foaming at the central portion in the thickness direction is especially enhanced, thereby expanding the foam resin sheet 23. As a result, a foam molded body 24 in which the average bubble diameter in the layer at the central portion of the foam resin sheet 23 in the thickness direction (central layer) is large and the average bubble diameter at the skin layer near the surface is small is obtained. Since such foam molded body 24 has a sandwich structure in which the central layer having larger average bubble diameter is sandwiched by skin layers having smaller average bubble diameter, the foam molded body 24 is light in weight and high in rigidity.

Figure 5:
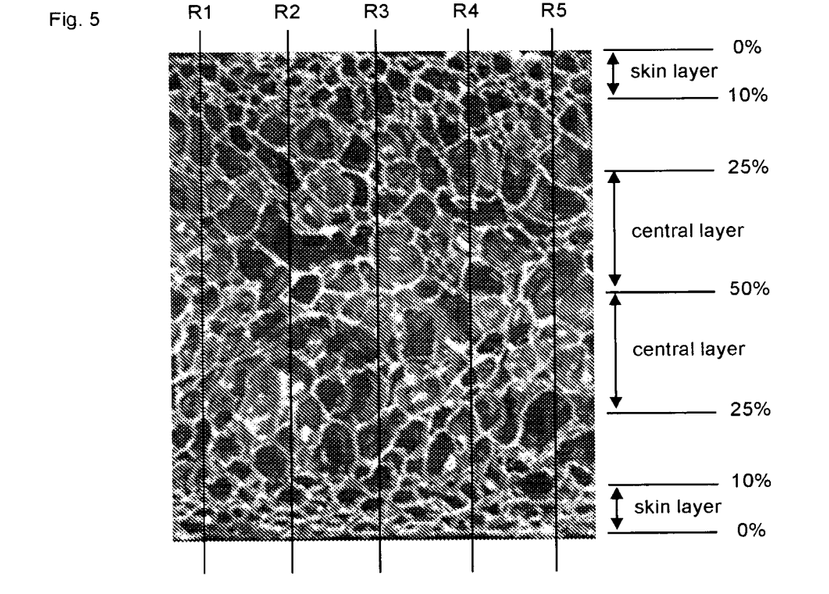
FIG. 5 is a sectional picture of the foam molded body 24 obtained in the embodiment of the present invention.

As shown in the sectional picture of FIG. 5, the foam molded body 24 obtained by the method of the present embodiment has a larger average bubble diameter at the central layer than the average bubble diameter at the skin layer (surface layer). Here, in the foam molded body 24, the skin layer is a layer located from a surface of the foam molded body 24 to 10% of the foam molded body 24 in a thickness direction of the foam molded body 24, and the central layer is a layer located from 25 to 50% of the foam molded body 24 in the thickness direction of the foam molded body 24 from the surface. The ratio of (average bubble diameter of central layer)/(average bubble diameter of skin layer) is not particularly limited, and is 1.2 to 10 for example. The ratio is, particularly for example, 1.2, 1.3, 1.4, 1.5, 1.6, 1.7, 1.8, 1.9, 2, 2.5, 3, 3.5, 4, 4.5, 5, 5.5, 6, 7, 8, 9 or 10, and can be in the range between the two values exemplified herein.

The average bubble diameter of the foam molded body 24 in the entirety of the thickness direction or the foam molded body 24 is, for example, 100 to 2000 μm. The average bubble diameter is, particularly for example, 100, 200, 300, 400, 500, 600, 700, 800, 900, 1000, 1500 or 2000 μm, and can be in the range between the two values exemplified herein. The average bubble diameter of the skin layer is, for example, 80 to 500 μm. The average bubble diameter is, particularly for example, 80, 100, 150, 200, 250, 300, 350, 400, 450 or 500 μm, and can be in the range between the two values exemplified herein. The average bubble diameter of the central layer is, for example, 100 to 2000 μm. The average bubble diameter is, particularly for example, 100, 200, 300, 400, 500, 600, 700, 800, 900, 1000, 1100, 1200, 1300, 1400, 1500, 1600, 1700, 1800, 1900 or 2000 μm, and can be in the range between the two values exemplified herein.

The average bubble diameter is measured in accordance with the following method.

First, as shown in FIG. 5, a sectional picture of the foam molded body 24 is taken by magnification of 50 times.

Then, five base lines of R1 to R5 which elongate in the thickness direction of the foam molded body 24 are drawn. The distance between the base lines are 500 μm.

With each of the base lines, the number of bubbles through which the base lines penetrate are counted for the layer under measurement (skin layer, central layer, or entirely in the thickness direction).

Maximum length in the thickness direction (length at a portion where the length in the thickness direction becomes maximum) is measured for each of the bubbles.

Provisional average bubble diameter is calculated for each of the base lines in accordance with formula (1). Further, arithmetical mean is calculated with the provisional average bubble diameter calculated for each of the base lines, thereby obtaining the average bubble diameter.

Provisional average bubble diameter=sum of maximum length of all of the bubbles counted/number of bubbles counted (Formula 1)

Figure 6:
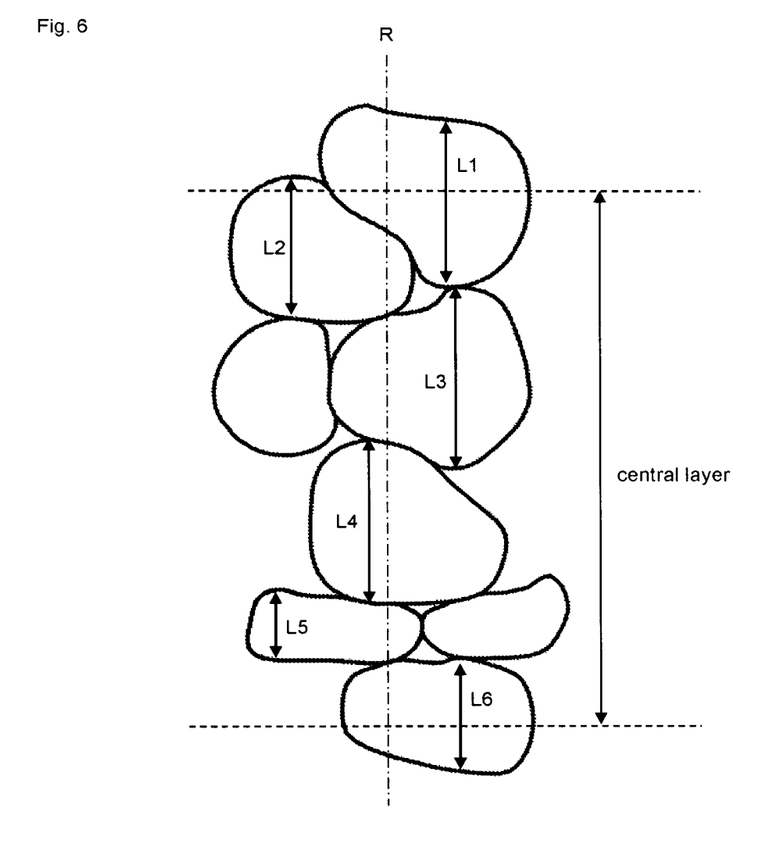
FIG. 6 shows one example of a configuration of the bubbles for explaining the calculation method of a provisional average bubble diameter.

In the example shown in FIG. 6, the number of bubbles through which the base line R penetrate is 6 in the central layer, and the maximum length in the thickness direction of each of the bubbles are L1 to L6. Accordingly, in this example, the provisional average bubble diameter of the central layer is calculated by (L1+L2+L3+L4+L5+L6)/6.

The expanding step is preferably performed by carrying out the first suction step, mold closening step, and the second suction step in this order. In the first suction step, as shown in FIG. 2b, the foam resin sheet is subjected to reduced pressure suction by the first mold 21, thereby shaping the foam resin sheet 23 to follow the shape of the cavity 21b of the first mold 21. In the mold closening step, as shown in FIG. 3a, molds 21 and 22 are closened to each other so as to provide a gap G between the molds 21 and 22. In the second suction step, as shown in FIG. 3b, the foam resin sheet 23 is subjected to reduced pressure suction by the molds 21 and 22 to expand the foam resin sheet 23 to the thickness of the gap G.

When the reduced pressure suction by the molds 21 and 22 are started after the molds 21 and 22 are closened to each other, the foam resin sheet 23 would come in contact with the convex portion 22c of the mold 22 before the foam resin sheet 23 is shaped. Usually, the temperature of the molds 21 and 22 are lower than the temperature of the foam resin sheet 23, and thus when the foam resin sheet 23 comes in contact with the convex portion 22c of the mold 22, the foam resin sheet 23 is cooled and its viscosity would increase. Accordingly, accuracy of the foam resin sheet 23 to follow the shape of the cavities 21b and 22b of the molds 21 and 22 would degrade. On the other hand, when the expanding step is carried out by performing the first suction step, mold closening step, and the second suction step in this order, the foam resin sheet 23 contacting the molds 21 and 22 before being shaped to follow the shape of the cavity 21b of the first mold 21 would be suppressed to minimum. Accordingly, the viscosity increase of the foam resin sheet 23 would be suppressed, and the foam resin sheet 23 can be allowed to follow the cavities of the molds 21 and 22 with high accuracy.

2.3 Finishing Step

Figure 4A:
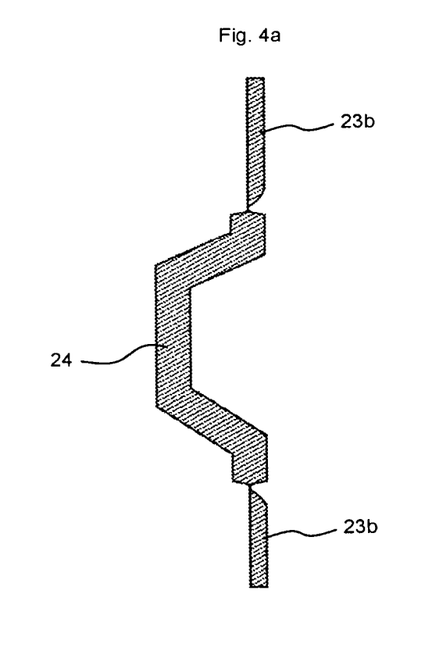
FIG. 4a is a sectional view corresponding to FIG. 2a, showing a foam molded body 24 with a burr 23b obtained in the step of FIG. 3b.
Figure 4B:
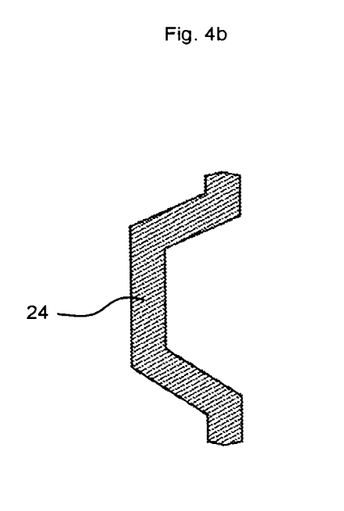

After the expanding step, the molds 21 and 22 are opened as shown in FIG. 4a, and the foam molded body 24 with burr 23b is taken out. The burr 23b is cut off to give the foam molded body 24 as shown in FIG. 4b.

As discussed, with the method of the present embodiment, the foam resin sheet 23 can follow the shape of the cavity of the mold with high accuracy even when the thickness of the foam resin sheet 23 is thick, and a foam molded body 24 which is light in weight and high in rigidity can be manufactured.

3. Application

Since the foam molded body 24 of the present invention is light in weight and high in rigidity, the foam molded body 24 can be used in various applications which consider such characteristics favorable. In addition, a covering material structured with a ventilation member such as a non-woven fabric can be provided on one side or both sides of the foam molded body 24. The covering material can be integrally molded onto one side or both sides of the foam molded body 24 by performing reduced pressure suction of the foam resin sheet 23 by the molds 21 and 22 in a similar manner as above, in a condition where the covering material is arranged at least at either one of between the foam resin sheet 23 and the mold 21 and between the foam resin sheet 23 and the mold 22.

The foam molded body 24 of the present invention can, for example, be utilized as interior member of a car such as door trim, ceiling material and the like; board such as luggage floor board and the like; duct; engine under cover; and the like. When the foam molded body 24 is utilized as the interior member of a car, it is preferable to integrally mold the covering material onto one side of the foam molded body 24. For example, in the conventional technique, the ceiling material was structured by adhering the covering material onto a polyurethane sheet by an adhesive and the like. In the present invention, the covering material can be integrally molded onto the foam molded body 24 and thus the burden to adhere the covering material can be omitted. In addition, the covering material can be fixed onto the foam molded body 24 by an anchor effect (effect to fix the covering material onto the resin by allowing the resin to permeate into the covering material), rather than using the adhesive.

Figure 7:
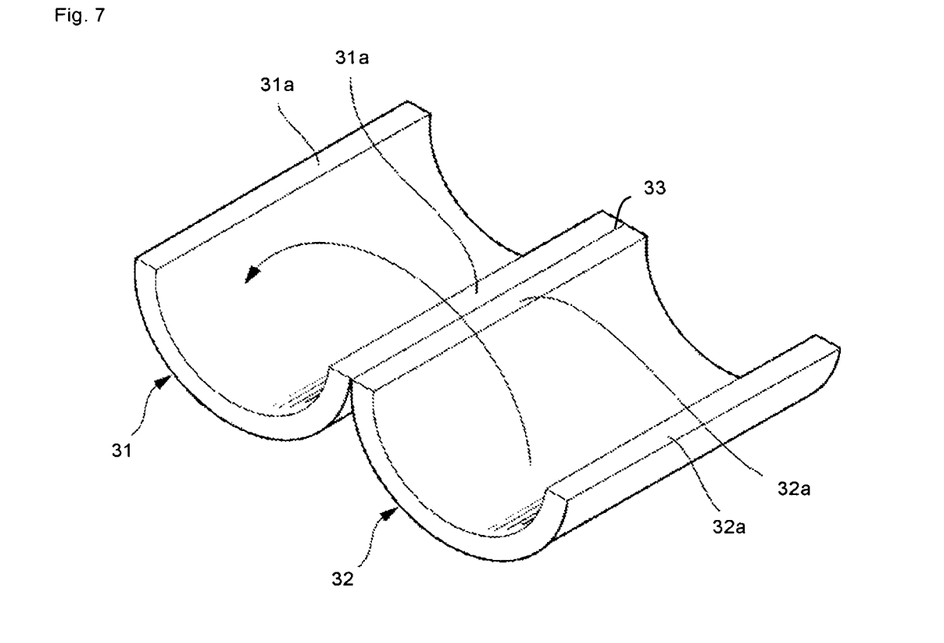
FIG. 7 is a perspective view showing the structure of duct half bodies 31 and 32 which are connected at the hinge portion 33.
Figure 8:
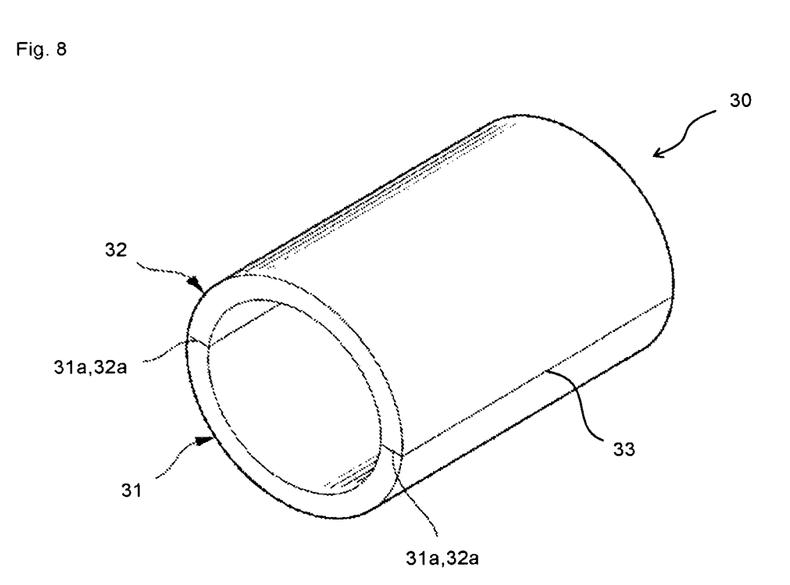
FIG. 8 is a perspective view showing the duct 30 formed by joining the duct half bodies 31 and 32.

As shown in FIG. 7 to FIG. 8, the duct 30 can be formed by joining a pair of duct half bodies 31 and 32 to form a cylindrical shape. The duct half bodies 31 and 32 are coupled with each other at the hinge portion 33. The duct half bodies 31 and 32 and the hinge portion 33 can be integrally molded by the manufacturing method described above. To each of the duct half bodies 31 and 32, joining surfaces 31a and 32a are provided respectively. The duct half bodies 31 and 32 are relatively rotated about the hinge portion 33, and then the duct half bodies 31 and 32 are joined with each other in a condition where the joining surfaces 31a and 32a are in contact with each other, thereby forming the duct 30. The duct half bodies 31 and 32 can be joined using a screw, a rivet, a tucker and the like.

EXAMPLES

Using the foam molding machine 1 shown in FIG. 1, the foam molded product (door trim) was manufactured. The inner diameter of the cylinder 13a of the extruder 13 was 50 mm, and equation of L/D=34 was satisfied. As the raw material resin, polypropylene based resin A (product name "Daploy WB140", available from Brealis AG) and polypropylene based resin B (product name "NOVATEC PP•BC4BSW", available from Japan Polypropylene Corporation) were combined by a mass ratio of 60:40, and 1.0 parts by weight of LDPE base master batch containing sodium hydrogen carbonate based foaming agent by 20 wt % (product name "FINECELL MASTER P0217K", available from Dainichiseika Color & Chemicals Mfg. Co., Ltd.) as nucleating agent; and 1.0 parts by weight of LLDPE base master batch containing 40 wt % of carbon black as colorant were added to 100 parts by mass of the resin and used. Temperature of each of the member was controlled so that the temperature of the foam resin sheet 23 would be in the range of 190 to 200° C. The rotation number of the screw was set to 60 rpm, and the extrusion amount was set to 20 kg/hr. As the foaming agent, $N_2$ was used and was injected via the injector 16. Amount of injection was set to 0.4 [wt %] (injection amount of $N_2$/extrusion amount of resin). T-die 18 was controlled so that the foam resin sheet 23 would have a thickness of 2 mm.

The foam resin sheet 23 formed under the afore-mentioned conditions was arranged between the molds 21 and 22. Subsequently, the foam resin sheet 23 was subjected to reduced pressure suction by the first mold 21, thereby shaping the foam resin sheet 23 to follow the shape of the cavity of the first mold 21. Then, in a condition where the molds 21 and 22 are closened to each other so that the gap G between the molds 21 and 22 is 3 mm, foam resin sheet 23 was subjected to reduced pressure suction by the molds 21 and 22, thereby allowing the foam resin sheet 23 to expand until the thickness of the foam resin sheet 23 reaches the thickness of the gap G. Accordingly, foam molded body 24 was obtained. The reduced pressure suction by the molds 21 and 22 was carried out under the pressure of −0.1 MPa.

The foam molded body 24 was light in weight and had high rigidity compared to general foam molded body. Sectional picture of the foam molded body 24 is shown in FIG. 5. The average bubble diameter of the foam molded body 24 was measured for the skin layer and the central layer, and were 132.3 µm and 184.2 µm, respectively. The ratio of (average bubble diameter of central layer)/(average bubble diameter of skin layer) was 1.39.

EXPLANATION OF SYMBOLS

1: foam molding machine, 2: resin supplying machine, 11: raw material resin, 12: hopper, 13: extruder, 13a: cylinder, 16: injector, 17: accumulator, 17a: cylinder, 17b: piston, 18: T-die, 21: first mold, 21a: reduced pressure suction holes, 21b: cavity, 21c: recessed portion, 21d: pinch off portion, 22: second mold, 22a: reduced pressure suction holes, 22b: cavity, 22c: convex portion, 22d: pinch off portion, 23: foam resin sheet, 23a: portion, 23b: burr, 24: foam molded body, 25: connecting tube, 27: connecting tube, 30: duct, 31 and 32: duct half body, 31a and 32a: joining surface, 33: hinge portion, G: gap, S: closed space

The invention claimed is:

1. A method for manufacturing a foam molded body, comprising the steps of:
   an arranging step to arrange one sheet of a foam resin sheet between a first mold and a second mold, the foam resin sheet being formed by extruding and dangling a molten foam resin from a slit; and
   an expanding step to expand the foam resin sheet by subjecting the foam resin sheet to a reduced pressure suction in a condition where the first mold and the second mold are closened to provide a gap between the first mold and the second mold, the gap having a thickness larger than a thickness of the foam resin sheet, thereby expanding the foam resin sheet to have the thickness of the gap,
   wherein a temperature of the foam resin sheet increases toward a center of the foam resin sheet in a thickness direction of the foam resin sheet in a state before the foam resin sheet comes in contact with any of the first and second molds
   wherein the expanding step comprises performing a first suction step, a mold closening step, and a second suction step in this order;
   the first suction step comprises subjecting the foam resin sheet to reduced pressure suction by the first mold, thereby shaping the foam resin sheet to follow a shape of a cavity of the first mold;
   the mold closening step comprises closening the first mold and the second mold to each other to provide the gap in between the first mold and the second mold;
   the second suction step comprises subjecting the foam resin sheet to reduced pressure suction by the first mold and the second mold, thereby expanding the foam resin sheet to have the thickness of the gap.

2. The method of claim 1, wherein an entirety of a portion, which gives the foam molded body, of the foam resin sheet is expanded in the expanding step.

3. The method of claim 1, wherein a cavity of the first mold and a cavity of the second mold are structured so that the gap in a portion, which gives the foam molded body of the foam resin sheet is substantially constant.

4. The method of claim 1, wherein a cavity of the first mold has a shape with a recessed portion, and a cavity of the second mold has a shape with a convex portion which comes into the recessed portion.

5. The method of claim 1, wherein the gap has a thickness of 1.1 to 3.0 times of the thickness of the foam resin sheet.

6. The method of claim 1, wherein an entirety of a portion, which gives the foam molded body, of the foam resin sheet is expanded in the expanding step.

7. The method of claim 1, wherein the cavity of the first mold and a cavity of the second mold are structured so that the gap in a portion, which gives the foam molded body of the foam resin sheet is substantially constant.

8. The method of claim 2, wherein a cavity of the first mold and a cavity of the second mold are structured so that the gap in the portion, which gives the foam molded body of the foam resin sheet is substantially constant.

9. The method of claim 1, wherein the cavity of the first mold has a shape with a recessed portion, and a cavity of the second mold has a shape with a convex portion which comes into the recessed portion.

10. The method of claim 2, wherein a cavity of the first mold has a shape with a recessed portion, and a cavity of the second mold has a shape with a convex portion which comes into the recessed portion.

11. The method of claim 3, wherein the cavity of the first mold has a shape with a recessed portion, and the cavity of the second mold has a shape with a convex portion which comes into the recessed portion.

12. The method of claim 2, wherein the gap has a thickness of 1.1 to 3.0 times of the thickness of the foam resin sheet.

13. The method of claim 3, wherein the gap has a thickness of 1.1 to 3.0 times of the thickness of the foam resin sheet.

14. The method of claim 4, wherein the gap has a thickness of 1.1 to 3.0 times of the thickness of the foam resin sheet.

* * * * *